United States Patent [19]

Werntz

[11] 4,006,815
[45] Feb. 8, 1977

[54] ARTICLE TRANSPORTING CONVEYOR

[75] Inventor: Charles W. Werntz, Ferguson, Mo.

[73] Assignee: Alvey Inc., St. Louis, Mo.

[22] Filed: Nov. 11, 1974

[21] Appl. No.: 522,473

[52] U.S. Cl. ................................ 198/781; 198/784
[51] Int. Cl.² ............... B65G 13/04; B65G 13/071; B65G 13/075
[58] Field of Search ............... 198/34, 127 R, 781, 198/784; 193/35 A, 37; 29/116 R

[56] References Cited

UNITED STATES PATENTS

| 1,959,157 | 5/1934 | Eggleston | 198/127 R |
| 2,529,684 | 11/1950 | Gass | 193/37 X |
| 2,602,536 | 7/1952 | Eggleston | 198/127 R |
| 2,976,981 | 3/1961 | Peras | 198/127 R |
| 3,337,023 | 8/1967 | Kohl | 198/127 R |
| 3,563,721 | 2/1971 | Ritter | 198/127 R X |
| 3,567,010 | 3/1971 | Stein | 198/127 R |
| 3,610,406 | 10/1971 | Fleischauer | 198/127 R |
| 3,621,982 | 11/1971 | Fleischauer | 198/127 R |
| 3,724,642 | 4/1973 | De Good | 198/127 R |
| 3,756,376 | 9/1973 | Kurger | 198/127 R |
| 3,810,538 | 5/1974 | Moyes | 198/127 R |

Primary Examiner—Evon C. Blunk
Assistant Examiner—James L. Rowland
Attorney, Agent, or Firm—Gravely, Lieder & Woodruff

[57] ABSTRACT

An article transporting conveyor having live rollers driven through power transmission rollers having a slip or non-slip connection with the live rollers in which the presence of the weight of articles to be conveyed increases the drive between the transmission rollers and the live rollers, but if the conveyor should experience a line blockage the transmission rollers would continue to function while the live rollers would slow and stop turning, thereby protecting the articles from damage and assuring minimum pressure on the articles from the drive transmission rollers.

4 Claims, 5 Drawing Figures

ARTICLE TRANSPORTING CONVEYOR

BRIEF SUMMARY OF THE INVENTION

This invention relates to article transporting roller conveyors in which a unique and simple drive to the article carrying rollers function to drive or not to drive depending on the freedom of movement of articles on the conveyor.

In the transportation of articles by live roller conveyors it is necessary to protect the articles against damage from impact and from pressure build-up in the event of a blockage to free movement. Some conveyors achieve the necessary protection by enforcing the development of a gap or space between articles by means of article actuated sensors which interrupt the drive. Some other conveyors arrive at about the same end result by varying the drive friction to the article carrying rollers, but such conveyors are victims of humidity and temperature variations and do not have uniform results, except under ideal conditions.

The present roller conveyor accomplishes the needed requirements of the art of protecting articles moved by live roller conveyors against crushing loads and impact of article against article. The unique and simple drive between the source of power and the article carrying rollers consists in effecting the drive transmission by establishing a limited contact between the drive roller means and the article supporting rollers and utilizing low friction material for the drive rollers having a character dissimilar from the article supporting rollers such that if conveyor line blockage occurs the drive rollers will be able to rotate with minimum drive effort exerted on the article supporting rollers.

The present article transporting roller conveyor lends itself to variations in the degree of drive friction needed when transporting articles having weight variations, so that the transport of successive light weight articles may be achieved with less power consumption than would be the case with a succession of heavy articles or than would be the case with articles which vary in weight and are haphazardly mixed on the same conveyor. Furthermore, if singulation or spacing between articles is desired the same may easily be achieved by a series of sensor controlled brakes applied to the article supporting rollers.

A preferred embodiment of this invention consists in an assembly of rollers, each carried at one end by an anti-friction bearing and carried at the opposite end by a loose fit on a low friction drive transmission roller, a shaft supporting the anti-friction bearing and transmission roller, side rails carrying the shaft in non-rotating fashion, and means to drive the transmission roller. The foregoing embodiment may be modified by the addition of brake means so that the articles are caused to move with intervening spaces and to maintain such spacing should blockage occur.

More particularly the invention encompasses a conveyor comprising side rails, a plurality of shafts fixed in and between the side rails to support an anti-friction bearing adjacent one side rail and a drive transmission roller adjacent the other side rail, article supporting rollers supported on said anti-friction bearing and said transmission roller with the latter support being limited to a line contact, and other friction means to drive the transmission rollers for rotating the article supporting rollers.

BRIEF DESCRIPTION OF THE DRAWINGS

The present invention is illustrated in certain embodiments in the accompanying drawings, wherein.

DETAILED DESCRIPTION OF THE EMBODIMENTS

Figure 1:
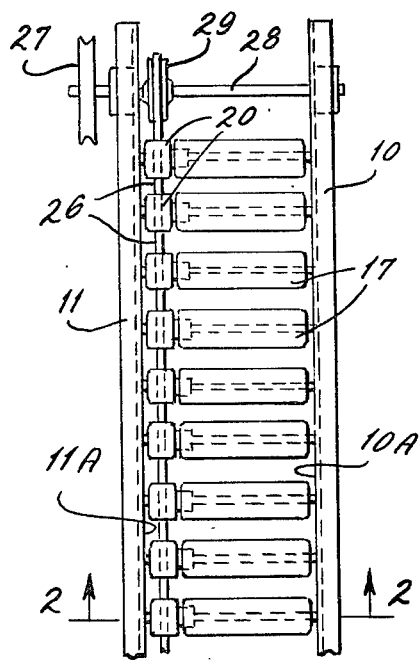
FIG. 1 is a plan view of a roller conveyor in which drive rollers and article carrying rollers are mounted in cooperative relation along the length of the supporting side rails.
Figure 2:
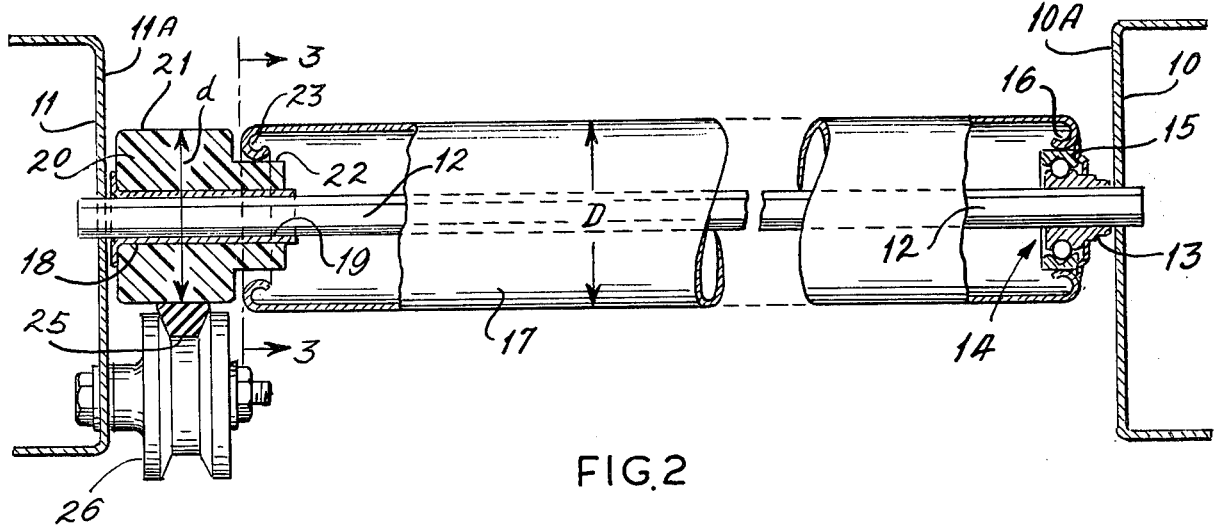
FIG. 2 is a greatly enlarged transverse section view taken at line 2—2 in FIG. 1 through a typical assembly of drive roller and article supporting roller to show a typical arrangement of these important parts and the drive therefore.

FIGS. 1 and 2 serve to show an article transporting roller conveyor assembly having elongated and spaced side rails 10 and 11 which are channels with the flanges directed outwardly so that the web 10A and 11A which are in facing relation may act as guides for articles to be conveyed. The webs of these rails are punched to form hexagonal apertures in aligned pairs to receive hexagonal shafts 12. Each shaft 12 adjacent rail 10 supports the nonrotating inner race 13 of an anti-friction bearing assembly 14. The outer race 15 of the assembly is engaged with the inwardly rolled lip 16 on the article supporting roller 17. The opposite end of each shaft 12 adjacent the rail 11 carries a non-rotating bushing or sleeve 18, and the outer surface of the sleeve 18 is round to receive the center bore 19 of a drive transmission roller 20. The roller 20 has a first surface 21 and a second surface 22 having a smaller diameter than that for the first surface. The second or smaller diameter surface 22 is provided to support the inwardly rolled lip 23 on the adjacent end of the article supporting roller 17. The roller 20 is made of a low friction material so slippage can occur between its surface and the means engaged therewith.

Figure 3:
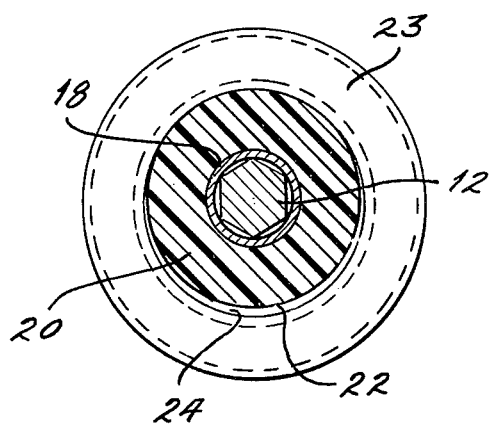
FIG. 3 is a section view taken at line 3—3 in FIG. 2.

The above described features of assembly of the conveyor components are shown in FIGS. 2 and 3 to have special characteristics. It is noted in these views that the inwardly turned lip 23 on the roller 17 has a larger inner diameter than the diameter of the second 22 on the roller 20, thereby creating a running clearance space 24 except where the roller lip 23 must engage the second surface 22 at the top of the vertical diameter (FIG. 3). The engagement is very close to being a line contact and it is at this line of engagement where final transmission of the drive occurs between the roller 20 and roller 17.

The drive roller 20 is engaged by the surface of a drive belt 25 which runs along under the respective series of drive rollers 20, and is suitably supported by snubbing rollers 26 carried by the web 11A of the side rail 11. There are, of course, many such snubbing rollers 26, each being mounted in the manner seen in FIG. 2, so that the required initial drive contact between the surface of belt 25 and the first surface 21 on roller 20 may be established at each drive transmission roller.

The operation of the conveyor above described in connection with FIGS. 1 to 3 is as follows: a drive motor (not shown) is connected to drive the input pulley or gear (as the case may be) 27 on shaft 28. The shaft 28 transmits the power input to pulley 29 for the drive belt 25. On operation of the belt 25 all of the drive transmission roller 20 are set in rotation. The article supporting rollers 17 are supported by gravity by the end lips 23 on the second surface 22 of each drive transmission roller 20, and the friction drag between these surfaces of engagement will cause the rollers 17 to rotate. Now as articles are placed on the conveyor, the weight thereof will increase the contact pressure between the roller lip 23 and the second surface 22, thereby improving the drive at the before noted line contact. In this arrangement it is important to have the diameter of the first surface 21 on the roller 20 sufficiently smaller than the outer diameter of the article supporting roller 17 so that articles are sure not to engage the first surface 21, as this first surface is intended to be engaged by the drive belt 25.

Figure 4:
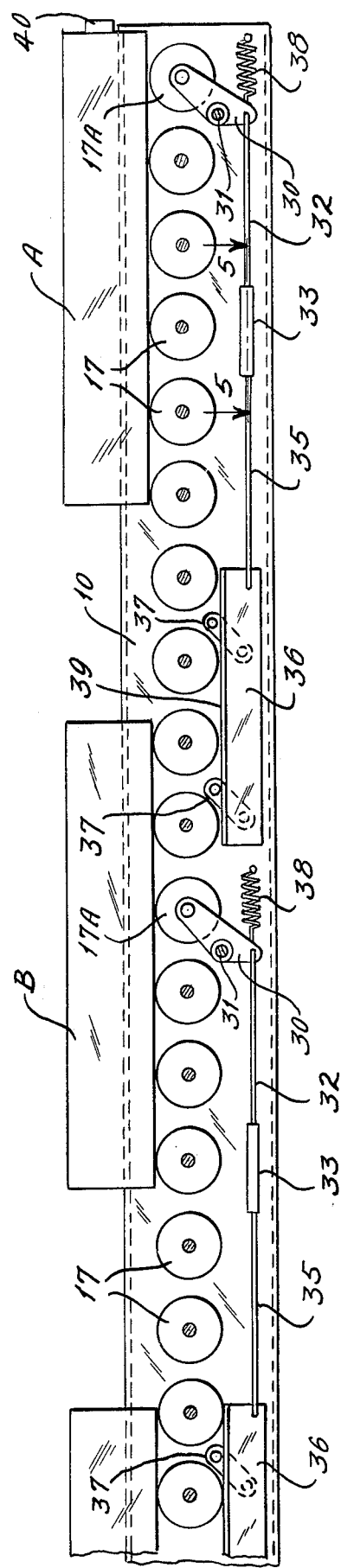
FIG. 4 is a side elevation view of a roller conveyor provided with roller brakes and sensors distributed along the length of the conveyor, whereby article spacing and singulation may be achieved.
Figure 5:
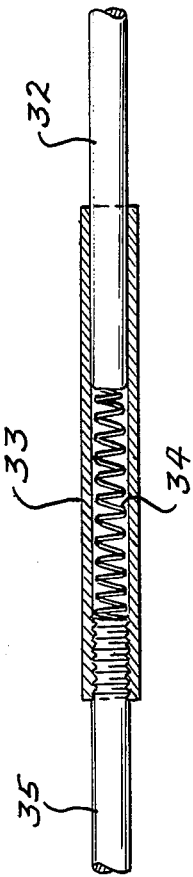
FIG. 5 is a fragmentary section view taken at line 5—5 in FIG. 4.

A modified embodiment seen in FIG. 4 includes the structure seen in the previous views. Thus, the side rail 10 is seen supporting the article supporting rollers 17 below the upper flange so that the articles are guided during conveyance. In this assembly every tenth roller 17A is a sensor and is supported on an arm 30 which is connected to the side rail 10 by the pivot 31. The arm reaches below the pivot and is connected to an actuator link 32 which includes a compression overtravel element to absorb motion of link 32 after the brake has been applied. The element consists of a sleeve 33 slidably mounted over the link 32 and a compression spring 34 in the sleeve. A second link 35 has one end threaded in the sleeve 33 as a stop for the spring. The opposite end is connected to a brake shoe 36. The shoe 36 is supported on a pair of links 37 which cause the shoe to rise when moved leftwardly and fall when moved rightwardly by return spring 38. The shoe is provided with a suitable brake surface 39 which engages a group of rollers 17 and arrests the advance of the article next following the lead article which caused the actuation of the brake shoe 36. A plurality of brake shoes 36 and actuation sensors 17A are carried by the conveyor assembly, and each sensor roller 17A is supported at its opposite ends by an arm 30. The sensor roller 17A is not driven but is free to rotate as articles pass over it. The spacing of the sensor rollers 17A may be varied to suit the length of articles to be moved.

In operation, it will appear from FIG. 4 that when a lead article A is arrested by a stop 40 it will depress the sensor roller 17A and move the links 32 and 35 leftwardly to apply the brake surface 39 to the adjacent rollers 17 which are engaged by the leading end of the next trailing article B which has depressed the adjacent sensor roller 17A to apply the associated upstream brake (not shown). In the condition of a free running conveyor the passage of articles will continually apply and release the brakes 39 so that the articles are maintained in spaced relation which is called singulation. When any article is stopped the sensor roller 17A which is depressed will actuate the upstream brake and start the progressive stopping of the upstream (trailing) articles before any trailing article has a chance to bang into any leading article.

The transport of articles on the conveyor of FIGS. 1 and 2 will proceed normally and the weight thereof on rollers 17 will merely improve the drive at the second surface 22 on roller 20. Now, should an article encounter a blockage to its travel, or be stopped for any reason, the second surface 22 at lip 23 will easily break driving engagement, the reason being that the material of the roller 20 is chosen from such consistent low friction material as phenolic laminate, oil saturated wood, delren, nylon, or similar material which show little or no friction changes due to humidity or temperature changes.

What is claimed is:

1. An article transporting conveyor comprising spaced side rails defining the sides of an article transporting path; a plurality of article supporting rollers extending between and of less length than the space between said side rails to make up an article conveying surface along the upper surfaces of said rollers; bearing means engaged in the ends of said rollers positioned adjacent one of said side rails; each of said rollers extending toward the opposite side rail and having an open end spaced from the opposite side rail and formed with an internal circular surface; drive transmission means operatively mounted at said opposite side rail and occupying the space between the open end of each roller and the opposite side rail and in axial alignment with the open ends of said rollers, each of said drive transmission means having a first cylindrical surface exposed in the space between said opposite side rail and the open ends of said adjacent article supporting rollers, said first cylindrical surface being smaller in diameter than said rollers so as to be out of contact with the articles supported on said rollers which may substantially fill the space between said side rails, and each of said drive transmission means having a second cylindrical surface extending axially into and loosely engaged with said adjacent article supporting roller open end adjacent said internal circular surface, said second cylindrical surface of said drive transmission means being smaller than said internal circular surface; and a source of power frictionally engaged with said first cylindrical surfaces of said drive transmission means, whereby on article stoppage said article supporting rollers slip at said loosely engaged ends on said second cylindrical surface and accumulation of stopped articles causes slippage of said first cylindrical surfaces to limit load on said drive means.

2. The conveyor of claim 1 in which the said drive transmission means is formed from low friction material selected from the group of phenolic laminates, oil saturated wood, Delrin, and nylon which have substantially no change of friction characteristics with changes in ambient temperature and humidity.

3. The conveyor of claim 1 and further comprising means to space the articles apart including sensor means spaced along the conveyor between groups of said article supporting rollers, brake means movable into and out of contact with said article supporting rollers, and compression overtravel operating means between a sensor means and the brake means upstream therefrom, the engagement of a lead article with a sensor means operating said brake means upstream therefrom to arrest the next article behind the lead article and said sensor means have lost motion relative to said brake means.

4. An article transporting conveyor comprising side rails in spaced parallel relation, a plurality of shafts extending between said side rails and fixedly supported thereby, an anti-friction bearing on each shaft adjacent one side rail to be in alignment with each other along said one side rail, drive roller means on each shaft adjacent the other side rail to be in alignment with each other along said other side rail, each of said drive roller means being formed of low friction material having a substantially uniform friction characteristics with changes in humidity and temperature, and each having a first cylindrical surface and a second cylindrical surface of which said first surface is larger in diameter than said second surface, article supporting rollers disposed over each shaft and each thereof engaged at one end on said anti-friction bearings and at the other end loosely engaged on said second surfaces of said drive roller means, drive means frictionally engaged with said first surfaces of said drive roller means, the transmission of the drive from said drive roller means to said article supporting rollers being effected by the engagement of said article supporting rollers at said second surfaces whereby on article stoppage said article supporting rollers slip at said loosely engaged ends accumulation of stopped articles causes slippage at said first surfaces to limit load on said drive means, means to space the articles apart including sensor means spaced along the conveyor between groups of said article supporting rollers, brake means movable into and out of contact with said article supporting rollers, and compression overtravel operating means between a sensor means and the brake means upstream therefrom, said compression overtravel operating means including an actuating link connected to said sensor means, a brake actuating link, a sleeve fixed to one of said links, and a resilient element carried by said sleeve and engaged by the other end of said links, said links, said resilient element allowing relative overtravel of said links, the engagement of a lead article with a sensor means operating said brake means upstream therefrom to arrest the next article behind the lead article and said sensor means having overtravel capability relative to said brake means.

* * * * *